US008979198B2

(12) United States Patent
Williams et al.

(10) Patent No.: US 8,979,198 B2
(45) Date of Patent: Mar. 17, 2015

(54) CHILD SAFETY SEAT

(75) Inventors: Bruce Williams, Narvon, PA (US);
Gregory Sellers, Christiana, PA (US);
Curtis M. Hartenstine, Birdsboro, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 212 days.

(21) Appl. No.: 13/352,493

(22) Filed: Jan. 18, 2012

(65) Prior Publication Data
US 2012/0181829 A1 Jul. 19, 2012

Related U.S. Application Data

(60) Provisional application No. 61/461,410, filed on Jan. 18, 2011.

(51) Int. Cl.
*A47D 1/10* (2006.01)
*B60N 2/28* (2006.01)

(52) U.S. Cl.
CPC ............ *B60N 2/2821* (2013.01); *B60N 2/2806* (2013.01); *B60N 2/2845* (2013.01); *B60N 2/2863* (2013.01)
USPC ..................................... 297/256.1; 297/250.1

(58) Field of Classification Search
USPC ............... 297/250.1, 256.1, 256.11, 410, 468
See application file for complete search history.

(56) References Cited

U.S. PATENT DOCUMENTS

| 6,030,047 | A * | 2/2000 | Kain | 297/484 |
| 6,979,057 | B2 * | 12/2005 | Sedlack | 297/256.15 |
| 7,438,358 | B2 * | 10/2008 | Jane Santamaria | 297/256.1 |
| 2007/0284925 | A1 * | 12/2007 | Balensiefer | 297/256.11 |
| 2008/0073957 | A1 * | 3/2008 | Mostert et al. | 297/250.1 |
| 2010/0253120 | A1 * | 10/2010 | Heisey et al. | 297/250.1 |

FOREIGN PATENT DOCUMENTS

| EP | 1006017 A2 | 6/2000 |
| EP | 1813469 A1 | 8/2007 |

* cited by examiner

Primary Examiner — Philip Gabler
(74) Attorney, Agent, or Firm — David I. Roche; Baker & McKenzie LLP

(57) ABSTRACT

A child safety seat includes a seat shell, a headrest and a latch. The seat shell has a seat portion and a backrest portion, the backrest portion having a rear surface, and a front surface for supporting a child's back. The headrest is adjustable along the backrest portion. The latch is accessible from the rear surface of the backrest portion, wherein the latch is biased to lock the headrest in position relative to the backrest portion.

18 Claims, 8 Drawing Sheets

US 8,979,198 B2

CHILD SAFETY SEAT

CROSS-REFERENCE TO RELATED APPLICATION(S)

This application claims priority to U.S. Provisional Patent Application No. 61/461,410 filed on Jan. 18, 2011.

BACKGROUND OF THE INVENTION

1. Field of the Invention

The present invention relates to child safety seats having an adjustable headrest.

2. Description of the Related Art

Conventionally, an automobile vehicle has seatbelts provided at the front and rear seats. The seatbelt includes shoulder and waist straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which has a separate harness to restrain movements of the child.

For providing a comfortable sitting environment, the child safety seat may have a headrest that is adjustable in height in accordance with the age and size of the child. In this regard, it may be desirable to provide a structure that allows the caregiver to adjust the headrest and the harness of the child safety seat in a convenient manner.

SUMMARY

The present application describes a child safety seat. According to one embodiment, the child safety seat includes a seat shell, a headrest and a latch. The seat shell has a seat portion and a backrest portion, the backrest portion having a rear surface, and a front surface for supporting a child's back. The headrest is adjustable along the backrest portion. The latch is accessible from the rear surface of the backrest portion, wherein the latch is biased to lock the headrest in position relative to the backrest portion.

In some embodiments, the latch includes two buttons that are biased in opposite directions parallel to a transverse axis of the backrest portion to come into locking engagement with the backrest portion and hold the headrest in position relative to the backrest portion.

DETAILED DESCRIPTION OF THE EMBODIMENTS

Figure 1:
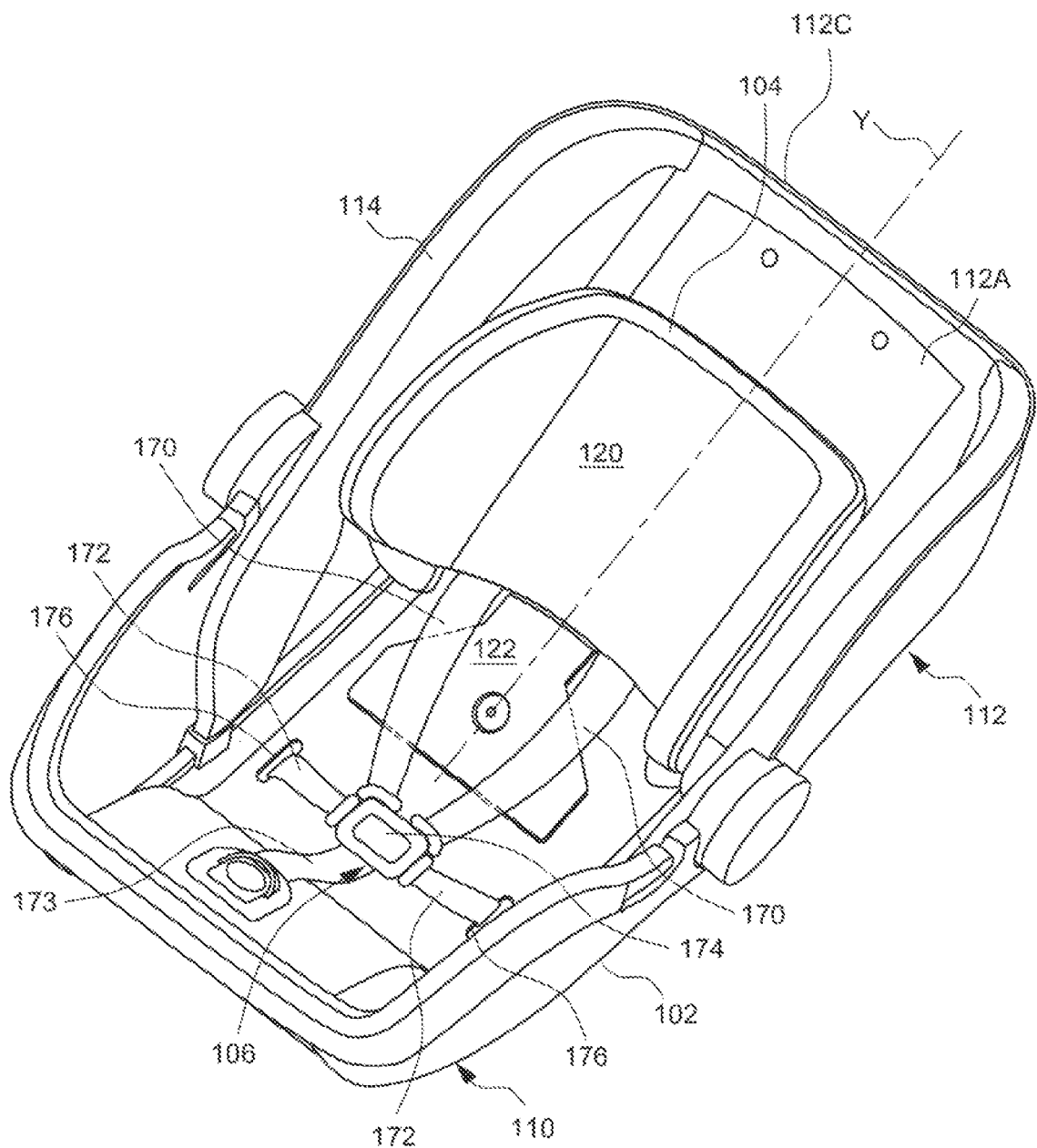
FIG. 1 is a schematic view illustrating one embodiment of a child safety seat.

FIG. 1 is a schematic view illustrating one embodiment of a child safety seat 100. The child safety seat 100 can include a seat shell 102, a headrest 104, and a restraint harness 106. The seat shell 102 can be formed in an integral body by plastic molding, and includes a seat portion 110 and a backrest portion 112. Left and right sides of the seat shell 102 can respectively include raised flanks 114 to provide lateral protection.

The headrest 104 can be assembled with the seat shell 102 so as to be adjustable along a lengthwise axis Y on a front surface 112A of the backrest portion 112. In one embodiment, the headrest 104 can include a head support 120 and a plate portion 122. The head support 120 can have a shape designed to provide comfortable resting support for a child's head. The plate portion 122 can extend downward from the head support 120, and be connect rearward with the seat shell 102. In this embodiment, the plate portion 122 can exemplary have a tapered shape that is narrower close to the head support 120 and larger away from the head support 120.

Figure 2:
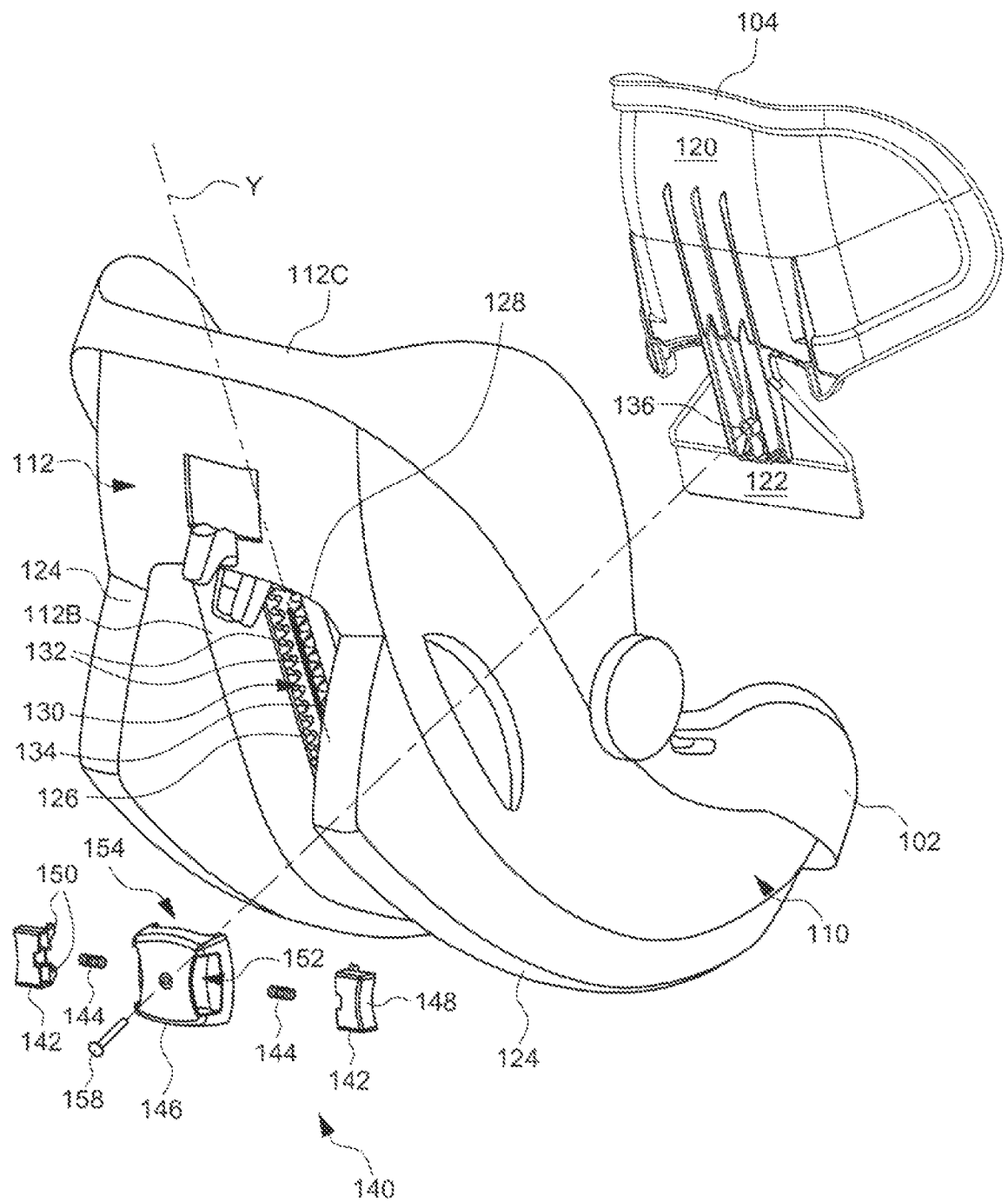
FIG. 2 is a an exploded view illustrating the assembly of a headrest with a seat shell in the child safety seat shown in FIG. 1.
Figure 3:
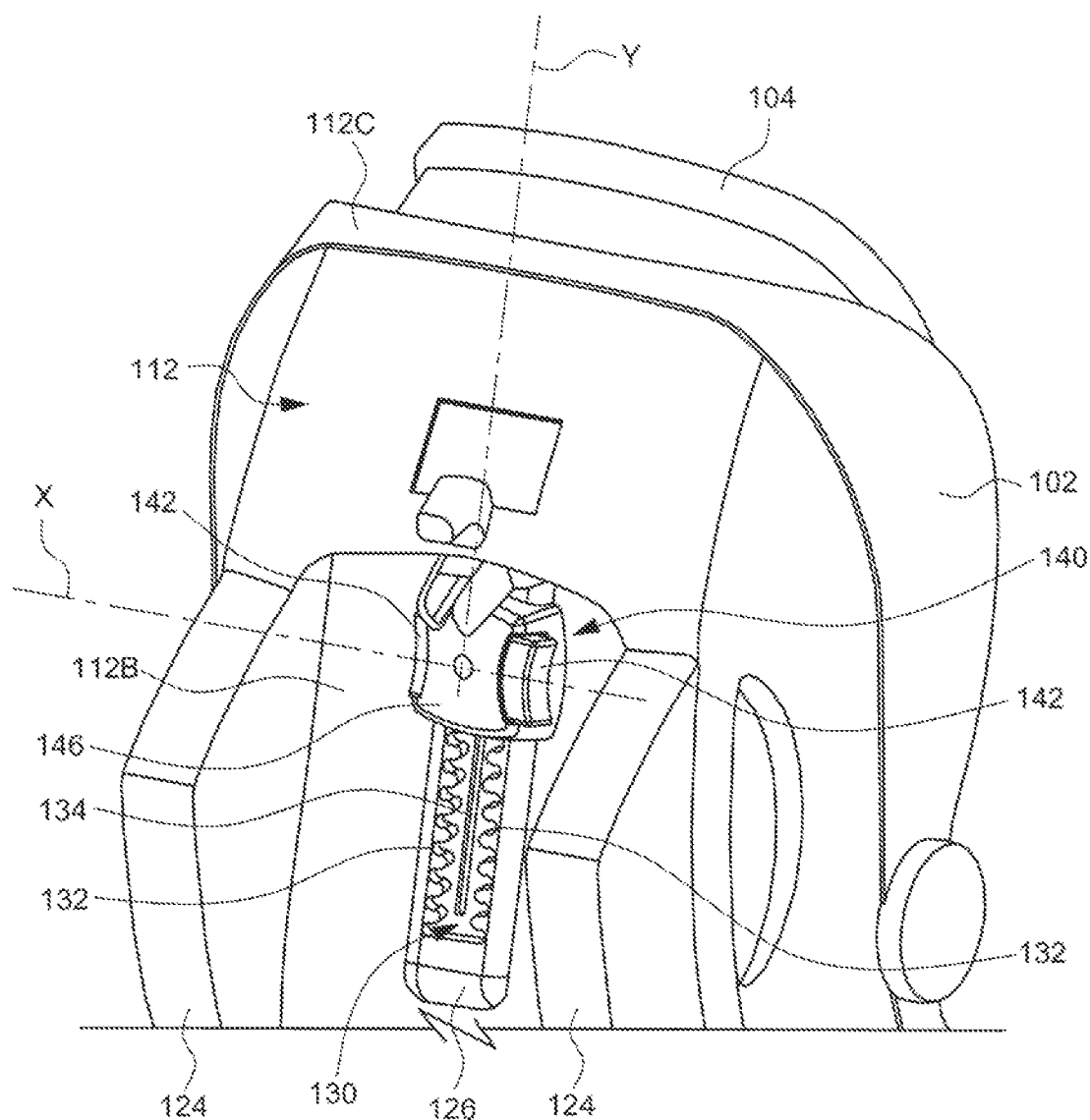
FIG. 3 is a partially enlarged view illustrating a rear region of the child safety seat shown in FIG. 1.

FIG. 2 is an exploded view illustrating the assembly of the headrest 104 with the seat shell 102, and FIG. 3 is an enlarged view illustrating a rear region of the child safety seat 100. As shown, the backrest portion 112 of the seat shell 102 can have a rear surface 112B that is sideways delimited between left and right side support rails 124, and upwardly delimited by a transverse ridge 128. A rack 126 extending parallel to the lengthwise axis Y can be formed on the rear surface 112B. In one embodiment, the rack 126 can be formed as a protruding strip of an elongated shape that is substantially spaced apart from a top 112C of the backrest portion 112. The rack 126 can include a slot 130 that extends along the length of the rack 126. The slot 130 has two opposite inner sidewalls along which are respectively provided a plurality of grooves 132 that form a locking structure for holding the headrest 104. Moreover, the front surface 112A of the backrest portion 112 can include an elongated slit 134 that communicates with the slot 130.

As shown in FIGS. 2 and 3, the plate portion 122 of the headrest 104 can have a rear surface provided with a protruding stem 136. When the headrest 104 is assembled on the front surface 112A, the stem 136 can be placed in alignment through the slit 134. The stem 136 can be movably mounted through the slit 134, such that the headrest 104 can be guided in movement along the lengthwise axis Y.

To hold the headrest 104 in position relative to the backrest portion 112, the child safety seat 100 can include a latch 140 that is coupled with the headrest 104 and can come into locking engagement with the backrest portion 112 to hold the headrest 104 in position. As shown, the latch 140 can be accessible from the rear surface 112B of the backrest portion 112. The latch 140 can include two buttons 142 that are coupled with associated springs 144. The buttons 142 and the springs 144 can be assembled with a housing 146 that is coupled with the headrest 104. It is worth noting that while the illustrated embodiment provide a latch 140 that is comprised of two buttons 142 associated with two springs 144, alternate embodiments of the latch 140 may also use one button 142 associated with one spring 144.

Figure 4:
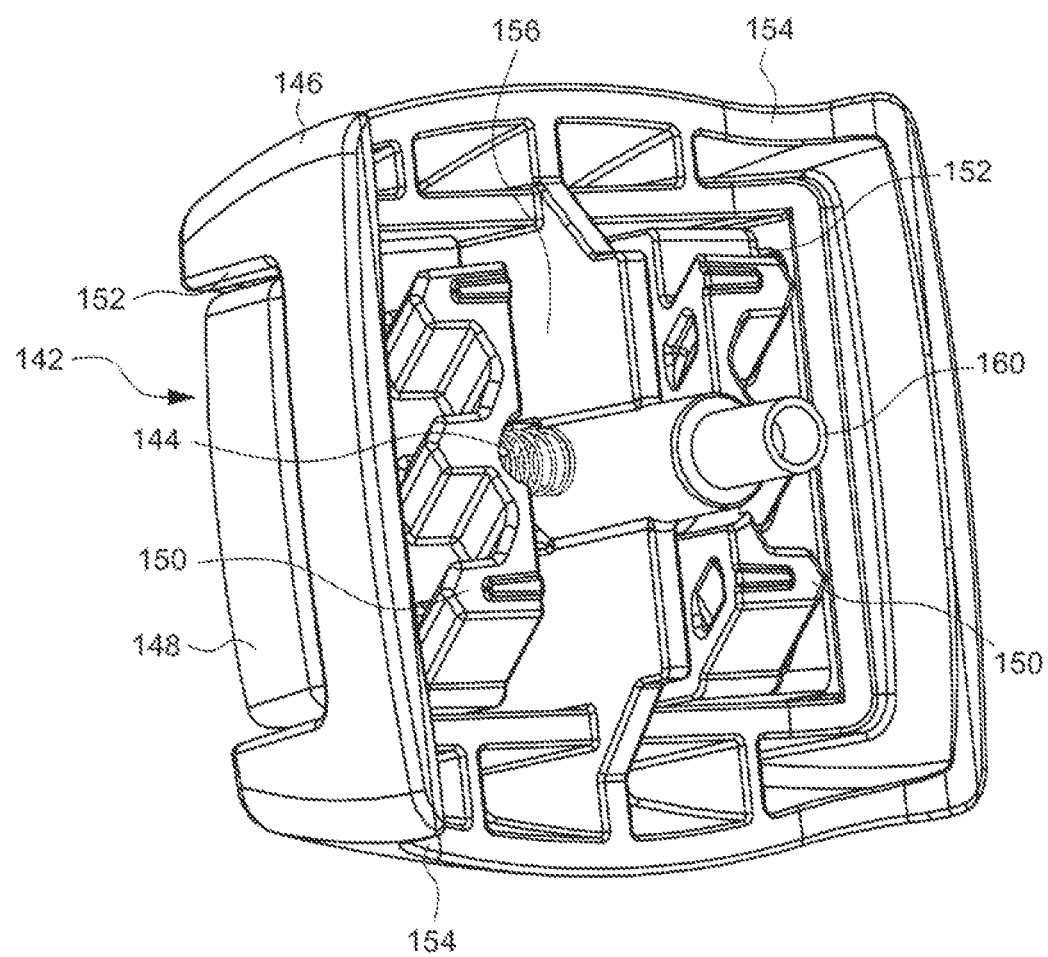
FIG. 4 is a schematic view illustrating the assembly of a latch of the headrest shown in FIG. 1.

FIG. 4 is a schematic view illustrating the assembly of the latch 140 and the springs 144 with the housing 146. Each of the buttons 142 can be formed with a rectangular shape having an actuation portion 148, and an engaging structure 150 projecting from one side. As illustrated, the engaging structure 150 can include one or more studs. Each of the buttons 142, including the actuation portion 148 and the engaging structure 150, can be formed integrally by plastic molding. In one embodiment, the engaging structure 150 of each button 142 can include three studs.

The housing 146 can have left and right sides respectively provided with side slots 152, and upper and lower sides respectively forming longitudinal openings 154. The buttons 142 can be restrainedly positioned in the side slots 152, and are movable along a transverse axis X of the backrest portion 112 substantially perpendicular to the lengthwise axis Y. Once the buttons 142 are assembled with the housing 146, the actuation portions 148 of the buttons 142 can be exposed outside the housing 146 through the side slots 152. Each of the springs 144 can have a first end connected with the associated button 142, and a second end connected with an inner central sidewall 156 of the housing 146 located between the side slots 152. The springs 144 can bias the buttons 142 in opposite directions parallel to the transverse axis X to have the engaging structure 150 respectively engaged with the grooves 132 of the rack 126.

To install the latch 140, the headrest 104 can be assembled on the front surface 112A of the backrest portion 112 with the stem 136 in alignment with the slit 134. The assembly of the housing 146, the latch 140 and the springs 144 can be mounted on the rear surface 112B with the rack 126 positioned through the longitudinal openings 154. A fastener element 158 (e.g., a rivet, screw, or the like) then can be engaged through a hollow shaft 160 of the housing 146, pass through the backrest portion 112 (i.e., the slot 130 of the rack 126 and the slit 134), and then couple with the stem 136 on the plate portion 122 of the headrest 104. With this construction, the headrest 104 can be placed on the front surface 112A of the backrest portion 112, whereas the latch 140 and the housing 146 can be coupled with the headrest 104 on the rear surface 112B of the backrest portion 112.

Figure 5:
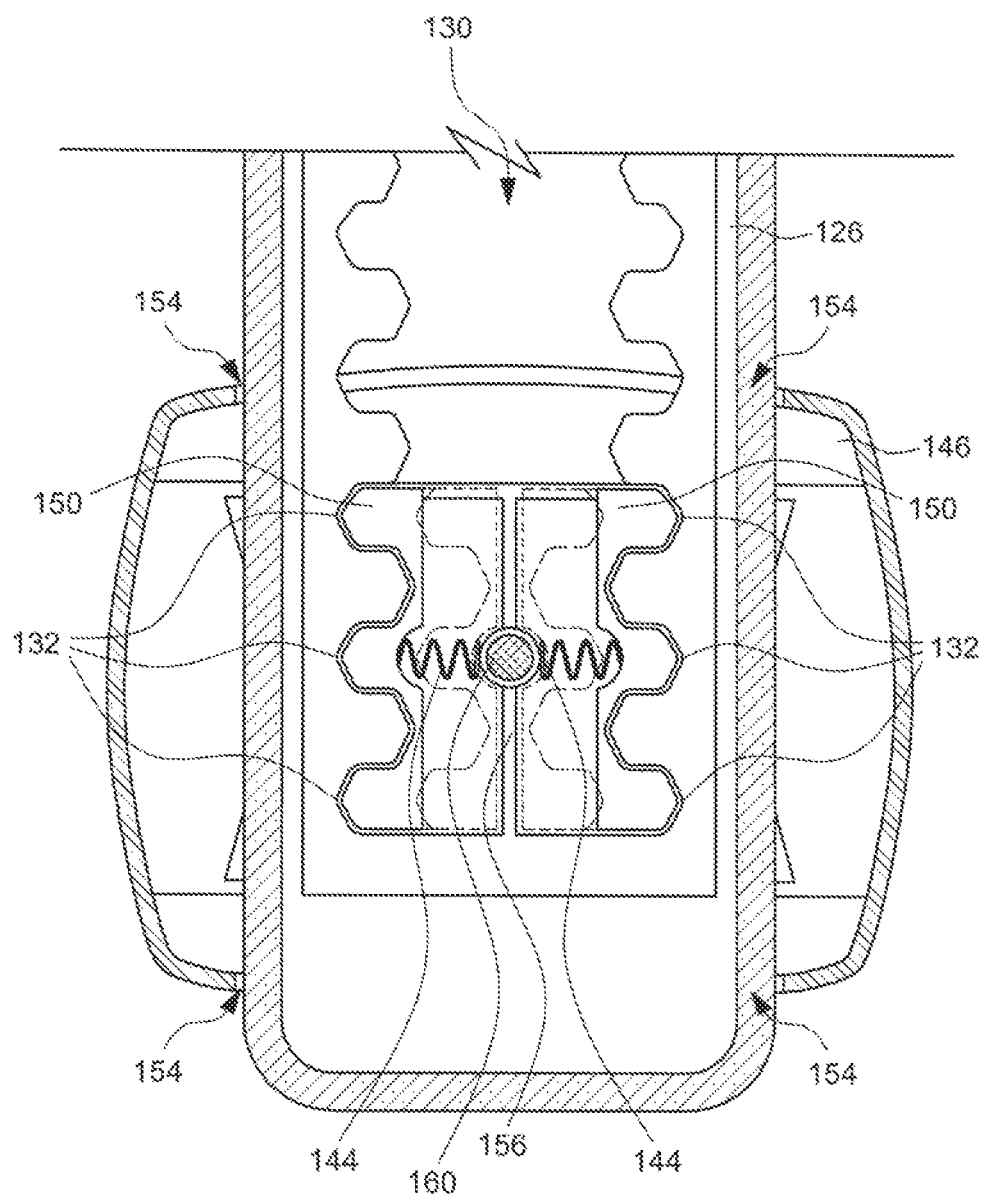
FIG. 5 is a schematic view illustrating the operation of the latch shown in FIG. 4.

FIG. 5 is a schematic view illustrating the interaction of the latch 140 with the rack 126. When the latch 140 is in a locked state, the springs 144 can bias the buttons 142 in opposite directions parallel to a transverse axis X toward the opposite inner sidewalls of the slot 130, such that the engaging structure 150 can engage with corresponding grooves 132 of the rack 126. The headrest 104 can be thereby locked in position relative to the backrest portion 112 at a desired height.

To adjust the headrest 104, the actuation portions 148 can be pressed to drive the buttons 142 in movement toward each other, which can disengage the engaging structure 150 from the grooves 132 and compress the springs 144. Once the locking engagement of the latch 140 is removed, the headrest 104 can be adjusted along the lengthwise axis Y. It is noted that while the buttons 142 are continuously held in the depressed state to keep the headrest 104 unlocked from the backrest portion 112, the buttons 142 and housing 146 can be grasped and displaced upward or downward for driving vertical adjustment of the headrest 104. Alternatively, the headrest 104 can also be grasped and displaced for upward or downward adjustment. While the headrest 104 is moving, the housing 146 can be guided to slide along the rack 126, and the engaging structure 150 can move along the slot 130. Once the headrest 104 reaches a desired height, the springs 144 can urge the buttons 142 to engage with the grooves 132. The locking engagement of the latch 140 with the backrest portion 112 can thereby hold the headrest 104 in position.

It is worth noting that while the aforementioned embodiments couples the latch 140 with the headrest 104, alternate embodiments may also provide a structure in which the latch 140 can be affixed with the rear surface of the backrest portion, whereas the locking structure of the rack 126 can be coupled and movable with the headrest.

Referring again to FIG. 1, the restraint harness 106 can include multiple harness straps, e.g., shoulder straps 170 waist straps 172, a crotch strap 173, and a buckle 174 connected with the crotch strap 173 and operable to attach the shoulder straps 170, the waist straps 172 and the crotch strap 173 together. The waist straps 172 can be passed through left and right side slits 176 provided on the seat portion 110. The shoulder straps 170 can extend at a front of the headrest 104 in a region below the head support 120, and routed upward behind the head support 120.

Figure 6:
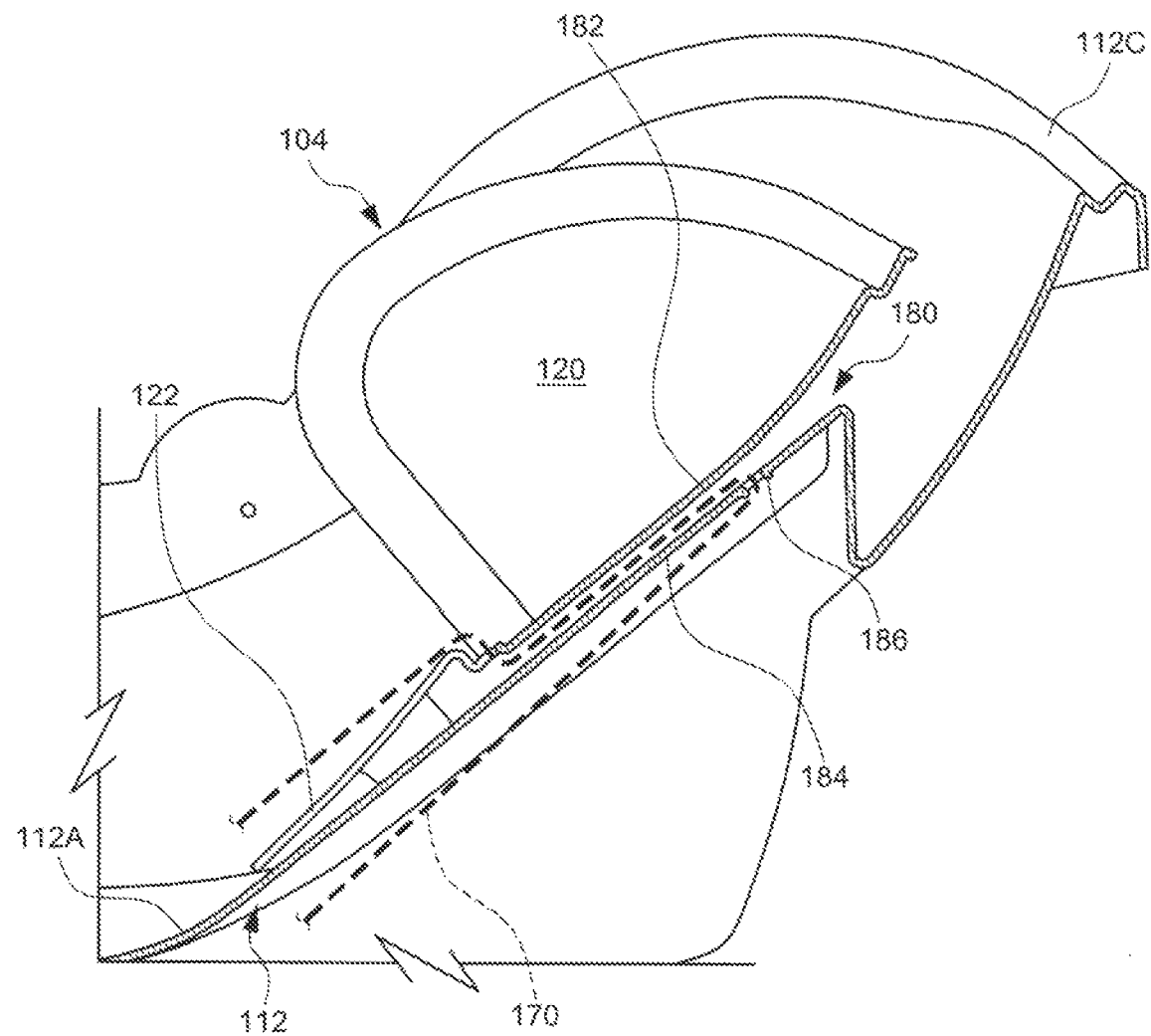
FIG. 6 is a partial cross-sectional view illustrating how a shoulder strap can be routed in the child safety seat shown in FIG. 1.

FIG. 6 is a partial cross-sectional view illustrating how the shoulder strap 170 can be routed in the child safety seat 100. The headrest 104 can be disposed such that a gap 180 can be defined above the plate portion 122 between a rear sidewall 182 of the headrest support 120 and the front surface 112A of the backrest portion 112. At the rear of the headrest 104, the shoulder strap 170 can extend upward and be held in the gap 180, and then pass through a slit 186 of the backrest portion 112 and travel downward on the rear surface 112B of the backrest portion 112.

When the headrest 104 is raised, e.g., to accommodate a taller child, more of the shoulder strap 170 can be exposed outward for use (i.e., provides more slack) below the head support 120. In contrast, when the headrest 104 is lowered, e.g., to accommodate a smaller child, less of the shoulder strap 170 is exposed outward below the head support 120, and more of the shoulder strap 170 become held in the gap 180. As a result, the height adjustment of the headrest 104 can also permit to modify the shoulder strap 170 to fit children of different sizes.

Figure 7:
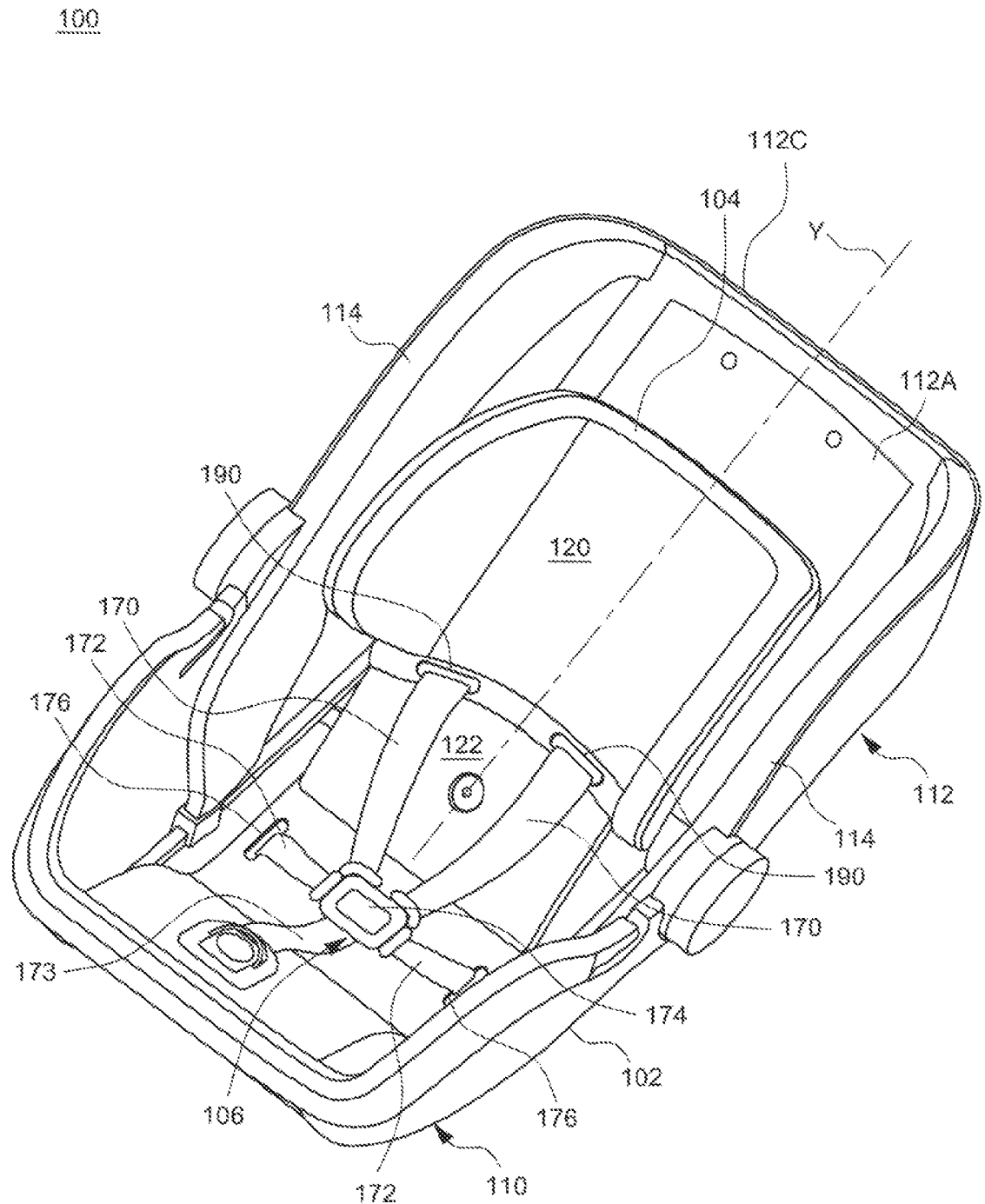
FIGS. 7 and 8 are perspective and partially cross-sectional views illustrating a variant embodiment for routing the shoulder strap through the headrest.
Figure 8:
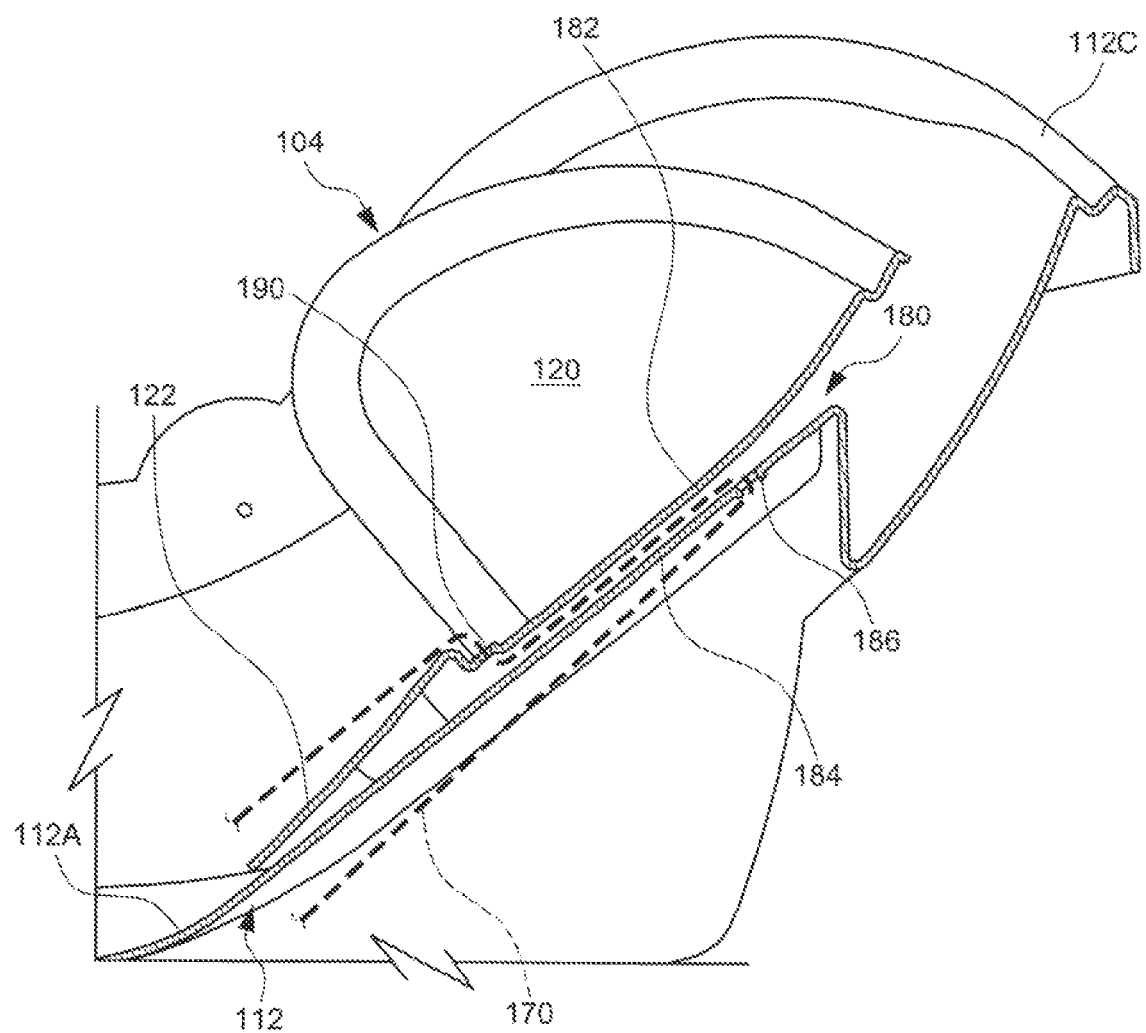

FIGS. 7 and 8 are perspective and partially cross-sectional views illustrating a variant embodiment for routing the shoulder strap 170 through the headrest 104. One difference of the embodiment shown in FIGS. 7 and 8 is that the headrest 104 can be provided with strap-routing slits 190 that are located at the plate portion 122. The shoulder strap 170 can extend on a front of the headrest 104 in a region below the head support 120, pass through the strap-routing slit 190 and extend upward in the gap 180, and then travel through the slit 186 and downward on a rear of the backrest portion 112.

At least one advantage of the structures described herein is the ability to provide a latch mechanism of the headrest that can be conveniently operated from a rear of the backrest portion. Moreover, the adjustment of the headrest can also permit to adjust more strap available for a taller child, and less strap for a smaller child.

Realizations in accordance with the present invention therefore have been described only in the context of particular embodiments. These embodiments are meant to be illustrative and not limiting. Many variations, modifications, additions, to and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat comprising:
a seat shell having a seat portion and a backrest portion, the backrest portion having a rear surface exposed outward, and a front surface for supporting a child's back, the rear and front surfaces being located at two opposite sides of the backrest portion, and the rear surface having a rack of an elongated shape, the rack having a row of grooves;
a headrest adjustable along the front surface of the backrest portion;
a housing affixed with the headrest and positioned on the rear surface, the housing straddling the rack;
a latch assembled through the housing and fixedly connected with a button, the button being exposed on the rear surface and accessible on a rear of the backrest portion, wherein the latch is biased to engage with several grooves in the row of the grooves of the rack behind the front surface to lock the headrest in position relative to the backrest portion, and the button is operable to disengage the latch from the rack for adjustment of the headrest;
wherein the housing includes two sidewalls spaced apart from each other along a longitudinal axis of the backrest portion, the two sidewalls respectively have two openings, and the rack extends along the longitudinal axis through the two openings on the two sidewalls of the housing.

2. The child safety seat according to claim 1, wherein the housing is secured with the headrest via a fastener element that passes through the rack and the backrest portion.

3. The child safety seat according to claim 1, wherein the button is movable parallel to a transverse axis of the backrest portion and is capable of engaging with the rack for holding the headrest in position relative to the backrest portion.

4. The child safety seat according to claim 3, wherein the rack includes a slot that extends along the rack, and the rack further has an inner sidewall adjacent to the slot on which is formed the row of the grooves, the button having an engaging structure that is movable along the slot during movement of the headrest and is configured to engage with several ones of the grooves to lock the headrest in position relative to the backrest portion.

5. The child safety seat according to claim 3, wherein the button is biased to engage with the rack by a spring.

6. The child safety seat according to claim 3, wherein the button and the latch are formed as an integral part including an actuation portion and an engaging structure, the actuation portion is held in a depressed state to unlock the headrest relative to the backrest portion and is displaced to drive movement of the headrest along with the latch.

7. The child safety seat according to claim 1, wherein the housing is coupled with the headrest via a fastener element that passes through the rack and the backrest portion, and the button being movable parallel to a transverse axis of the backrest portion and capable of engaging with the rack for holding the headrest in position.

8. The child safety seat according to claim 1, further including a harness strap that extends at a front of the headrest, wherein the headrest has a sidewall, and a portion of the harness strap is held in a gap delimited between the sidewall of the headrest and the front surface of the backrest portion.

9. The child safety seat according to claim 8, wherein an upward movement of the headrest exposes more of the harness strap below the headrest, and a downward movement of the headrest exposes less of the harness strap below the headrest and causes more of the harness strap to be held in the gap.

10. A child safety seat comprising:
a seat shell having a seating portion and a backrest portion, the backrest portion having a central longitudinal axis, a transverse axis, a rear surface exposed outward, and a front surface for supporting a child's back;
a rack having an elongated shape and two rows of grooves, the rack being arranged on the rear surface adjacent to the central longitudinal axis;
a headrest assembled with the backrest portion, the headrest being adjustable along the front surface of the backrest portion;
a housing affixed with the headrest and positioned on the rear surface adjacent to the rack, the housing having a left and a right housing portion and straddling the rack;
two buttons assembled through the housing and accessible on the rear surface, each of the two buttons being formed to include an engaging structure capable of engaging with one corresponding row of the grooves, and an actuation portion that extends from the engaging structure in a direction away from the central longitudinal axis, the left and right housing portions being respectively interposed between the actuation portions of the two buttons and the rear surface, wherein the two buttons are biased in opposite directions parallel to the transverse axis of the backrest portion to come into locking engagement with the rack behind the front surface and hold the headrest in position relative to the backrest portion;
wherein the housing includes two sidewalls spaced apart from each other along the central longitudinal axis of the backrest portion, the two sidewalls respectively have two openings, and the rack protrudes from the rear surface and extends along the central longitudinal axis through the two openings on the two sidewalls of the housing.

11. The child safety seat according to claim 10, wherein the actuation portions are held in a depressed state to disengage the engaging structures from the backrest portion and are displaced to drive the headrest in movement along with the buttons.

12. The child safety seat according to claim 10, wherein the buttons are biased to engage with the backrest portion by two springs.

13. The child safety seat according to claim 10, wherein the headrest includes a head support, and a plate portion extending downward from the head support, the housing being coupled with the plate portion and having a width that is smaller than the plate portion.

14. The child safety seat according to claim 10, further including a harness strap that extends at a front of the headrest, wherein the headrest has a sidewall, and a portion of the harness strap is held in a gap delimited between the sidewall of the headrest and the front surface of the backrest portion.

15. The child safety seat according to claim 14, wherein an upward movement of the headrest exposes more of the harness strap below the headrest, and a downward movement of the headrest exposes less of the harness strap below the headrest and causes more of the harness strap to be held in the gap.

16. The child safety seat according to claim 10, wherein the housing is adjacent to the central longitudinal axis, and is coupled with the headrest via a fastener element that respectively passes through the backrest portion and through the rack between the two rows of the grooves.

17. The child safety seat according to claim 1, wherein the rack is located at a middle of the rear surface.

18. The child safety seat according to claim 1, wherein the housing is arranged adjacent to a central longitudinal axis of the backrest portion, and the button is disposed through the housing the button extending transversally away from the central longitudinal axis past the row of the grooves when the latch is engaged with the rack.

* * * * *